(12) United States Patent
Fukuda et al.

(10) Patent No.: US 6,297,890 B1
(45) Date of Patent: Oct. 2, 2001

(54) CODED DATA OUTPUT APPARATUS

(75) Inventors: Hiroyuki Fukuda, Hachioji; Shinzo Matsui, Yamanashi-ken, both of (JP)

(73) Assignee: Olympus Optical Co. Ltd., Tokyo (JP)

( * ) Notice: Subject to any disclaimer, the term of this patent is extended or adjusted under 35 U.S.C. 154(b) by 0 days.

(21) Appl. No.: 09/662,233

(22) Filed: Sep. 14, 2000

Related U.S. Application Data

(63) Continuation of application No. 09/357,413, filed on Jul. 20, 1999, which is a continuation of application No. 08/819,909, filed on Mar. 18, 1997, now Pat. No. 6,014,501.

(30) Foreign Application Priority Data

Mar. 28, 1996  (JP) .................................................. 8-073483

(51) Int. Cl.[7] ............................ G06K 15/02; G06K 19/06
(52) U.S. Cl. ............................................. 358/1.9; 235/494
(58) Field of Search ............................ 358/1.9, 1.2, 456, 358/459, 298; 235/494, 454

(56) References Cited

U.S. PATENT DOCUMENTS

| 4,737,858 | * | 4/1988 | DeBaryshe | 358/296 |
|---|---|---|---|---|
| 5,457,541 | * | 10/1995 | Burns | 358/298 |
| 5,866,895 | * | 2/1999 | Fukuda et al. | 235/494 |
| 5,898,166 | * | 4/1999 | Fukuda et al. | 235/494 |
| 6,014,501 | * | 1/2000 | Fukuda et al. | 358/1.9 |
| 6,098,882 |   | 8/2000 | Antognini et al. . | |
| 6,119,937 | * | 9/2000 | Wang et al. | 235/494 |

FOREIGN PATENT DOCUMENTS

| 0670555 A1 |   | 9/1995 | (EP) . | |
|---|---|---|---|---|
| 0 670 555 A1 | * | 9/1995 | (EP) | 358/298 |
| 0717398 A3 |   | 6/1996 | (EP) . | |
| 5-54165 |   | 3/1993 | (JP) . | |
| 5-159112 |   | 6/1993 | (JP) . | |

* cited by examiner

Primary Examiner—Scott Rogers
(74) Attorney, Agent, or Firm—Frishauf, Holtz, Goodman, Langer & Chick, P.C.

(57) ABSTRACT

A coded data output apparatus comprises an image data input or generation section, a resolution parameter specifying section, a resolution parameter modifying section and an image data output section. The image data input or generation section inputs or generates data for a dot code image to be printed. The resolution parameter specifying section specifies parameter data relating to the resolution of the image data input or generated by the image data input or generation section. The resolution parameter modifying section modifies the parameter data relating to the resolution specified by the resolution parameter specifying section according to the characteristic specific to the applied plate making apparatus. The image data output section outputs the input or generated image data according to the parameter data relating to the resolution and modified by the resolution parameter modifying section.

5 Claims, 11 Drawing Sheets

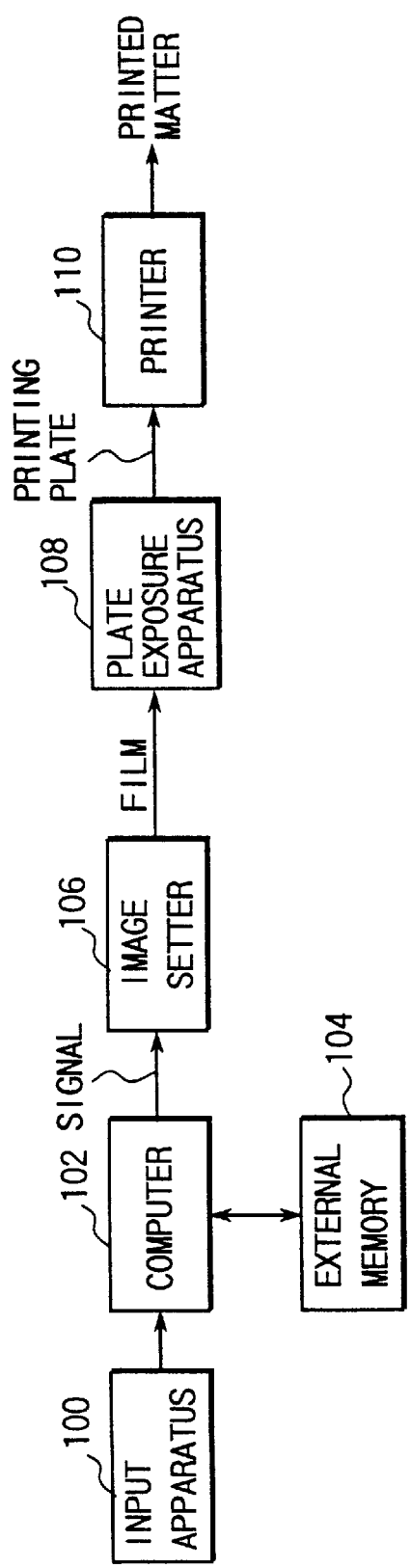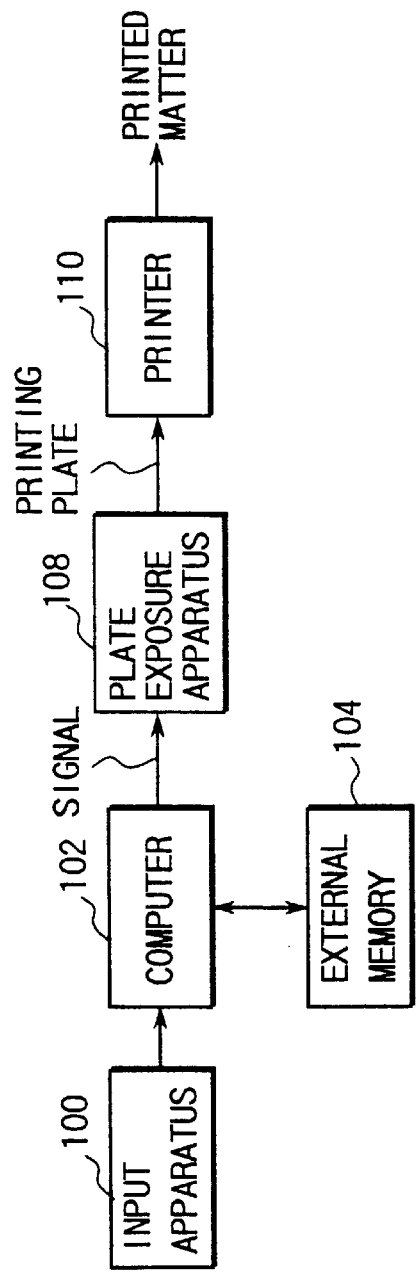

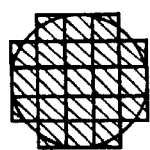
5C
FIG. 7A
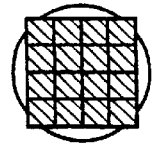
4S
FIG. 7B
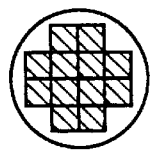
4C
FIG. 7C
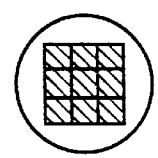
3S
FIG. 7D
| RESOLU-TION | DOT PITCH μm | DARK | NORMAL | LIGHT | LIGHT |
|---|---|---|---|---|---|
| 2400 | 63.5 |  5S | 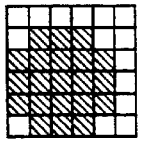 5C | 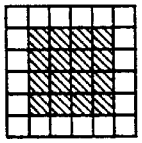 4S | 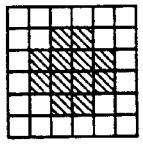 4C |
| 2540 | 60 | | | | |
| 3000 | 59.3 |  6S | 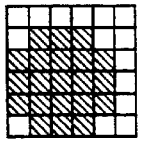 6C | 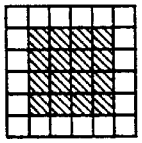 5S | 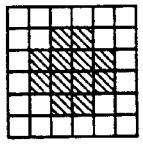 5C |
FIG. 8

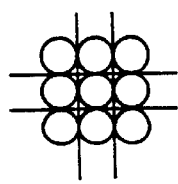
F I G. 9
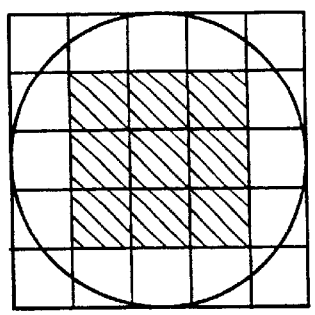
F I G. 1 0 A
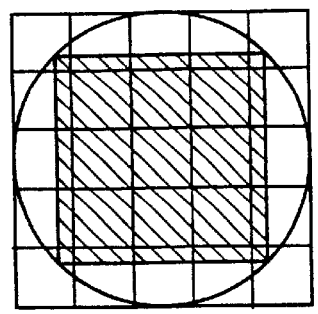
F I G. 1 0 B
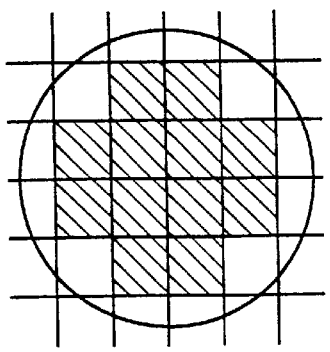
F I G. 1 0 C
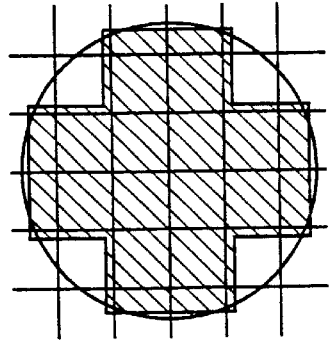
F I G. 1 0 D
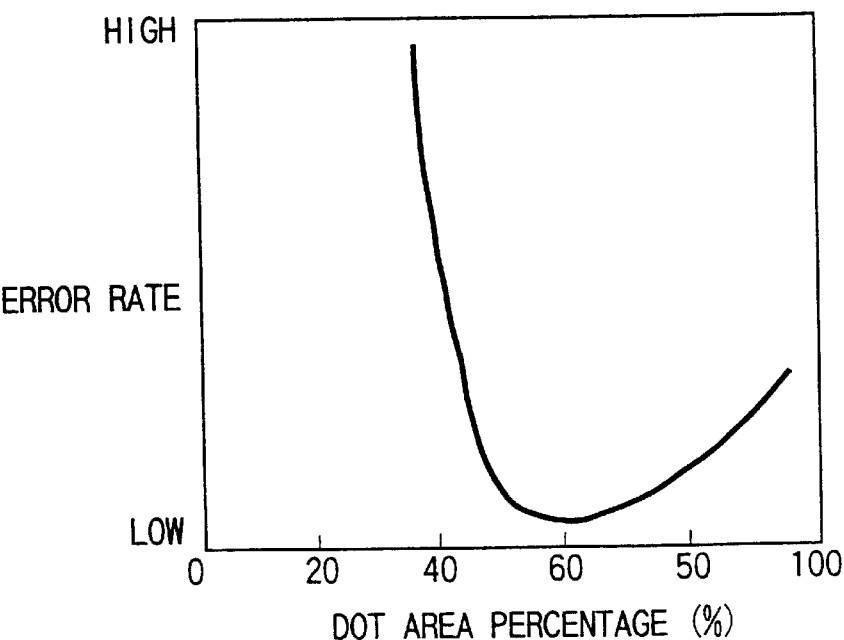
F I G. 1 1

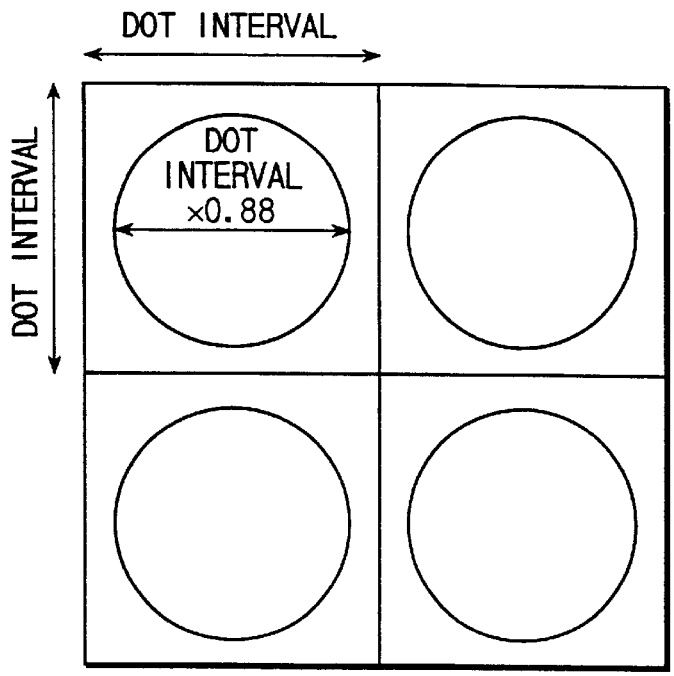
F I G. 1 2
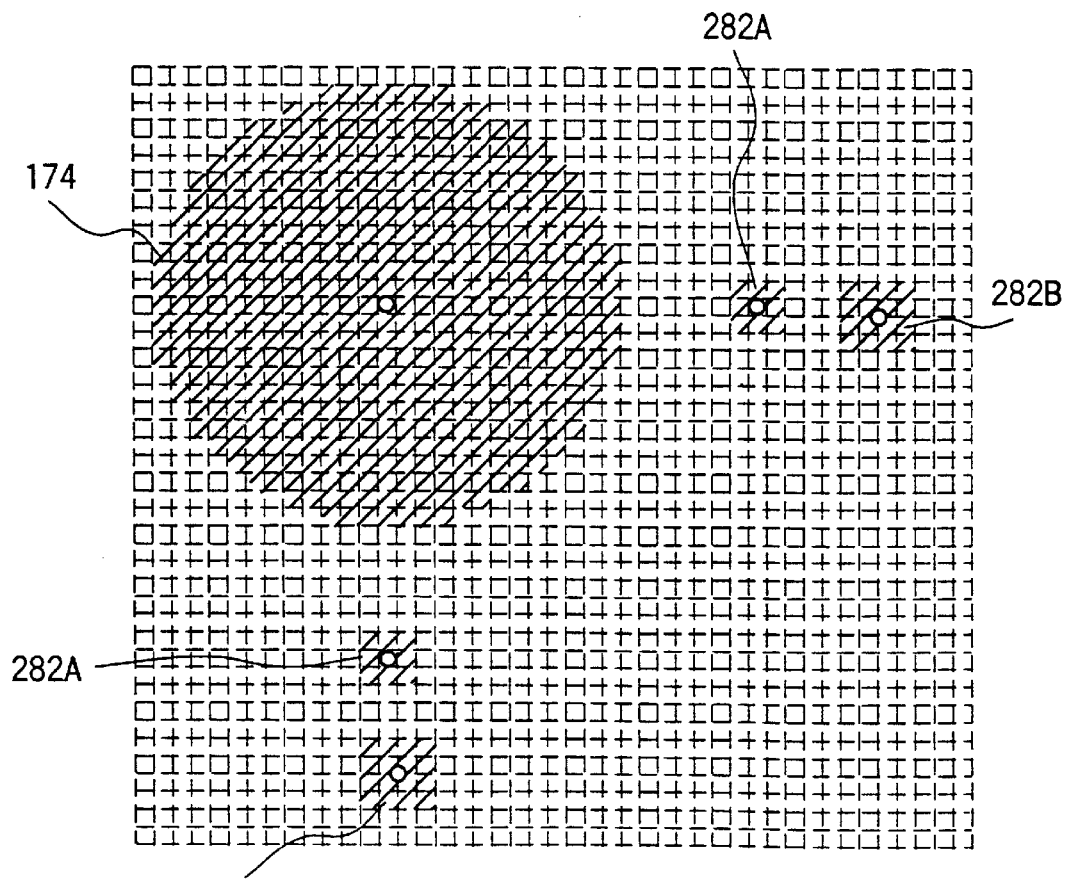
F I G. 1 3

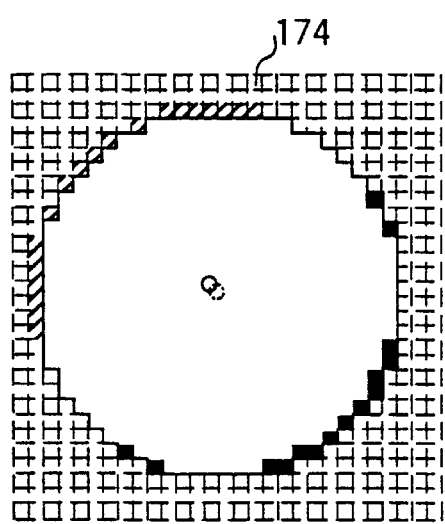
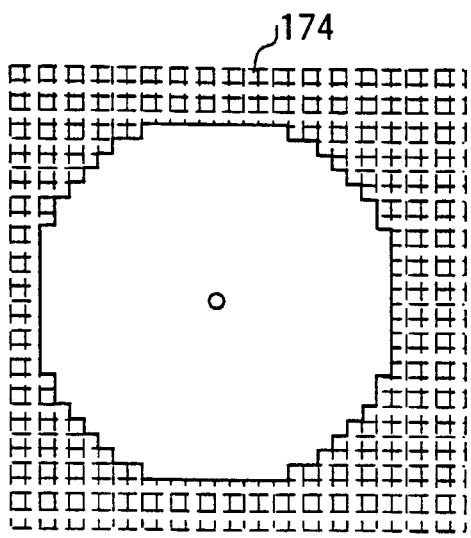
F I G. 1 4 A       F I G. 1 4 B
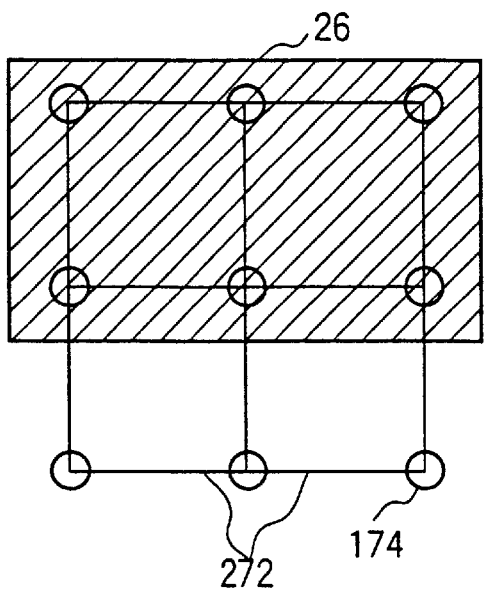
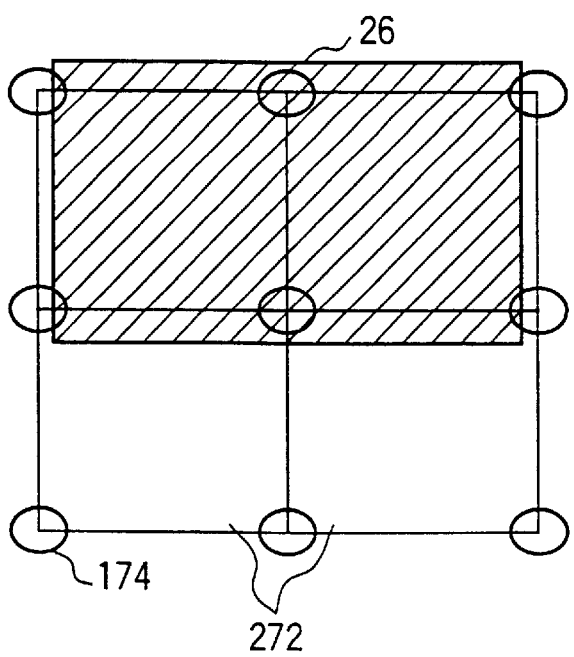
F I G. 1 5 A       F I G. 1 5 B

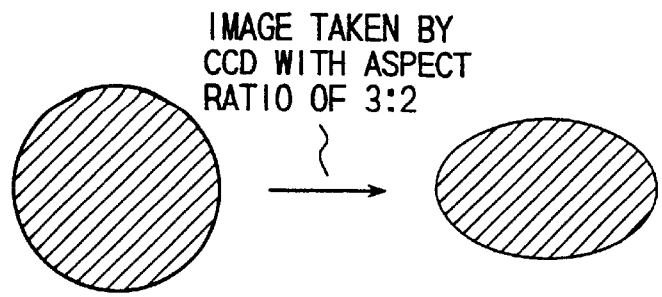
FIG. 16A
FIG. 16B
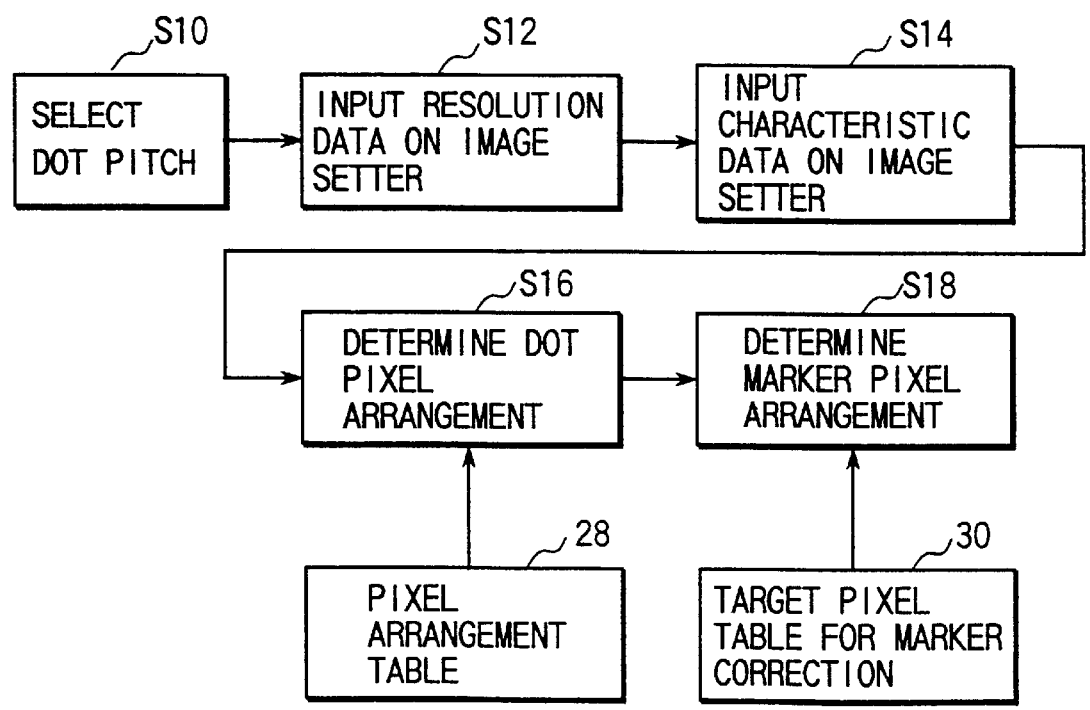
FIG. 17

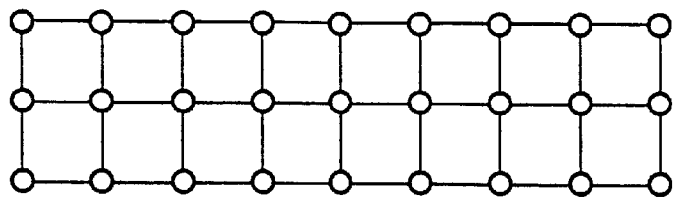
F I G. 1 8 A
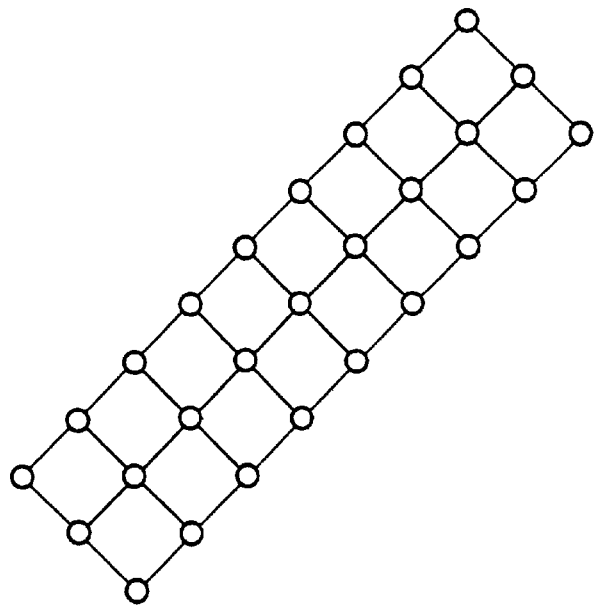
F I G. 1 8 B
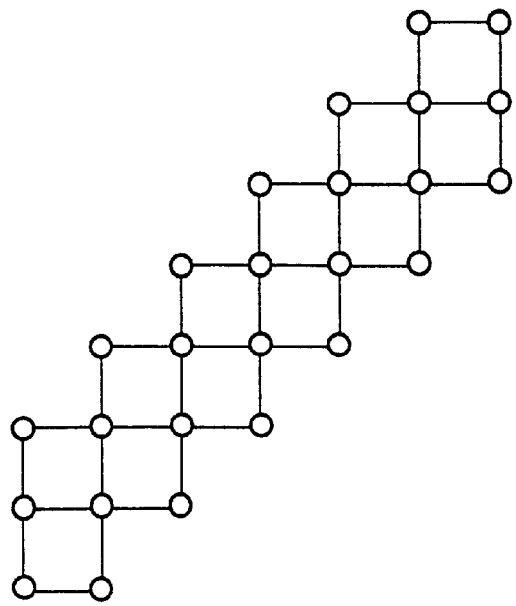
F I G. 1 8 C

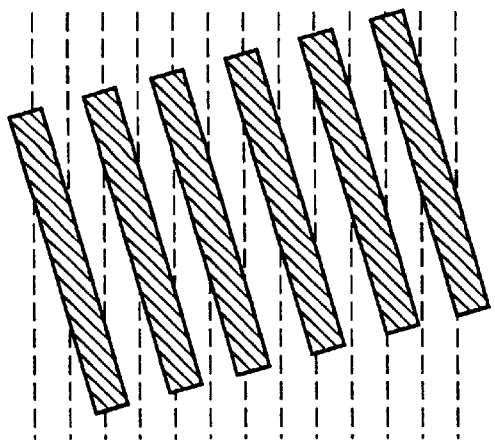
F I G. 1 9 A
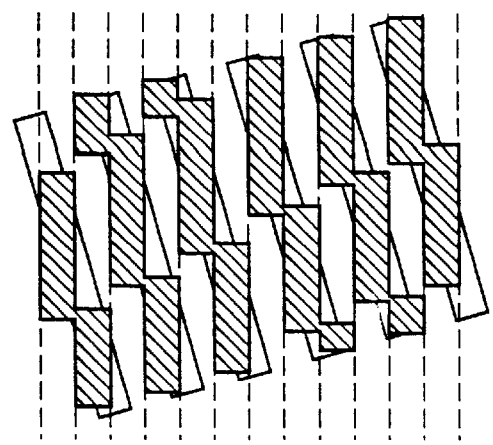
F I G. 1 9 B
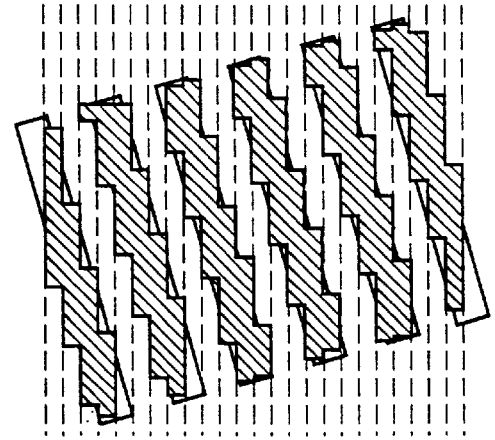
F I G. 1 9 C
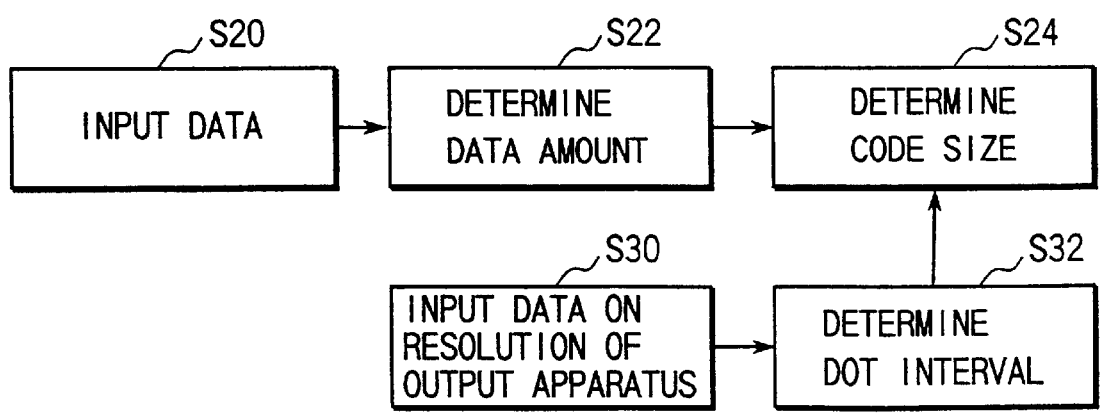
F I G. 2 0

CODED DATA OUTPUT APPARATUS

This is a continuation of application Ser. No. 09/357,413 filed Jul. 20, 1999 which is a Continuation of parent application Ser. No. 08/819,909 filed on Mar. 18, 1997, now U.S. Pat. No. 6,014,501, issued Jan. 11, 2000.

BACKGROUND OF THE INVENTION

This invention relates to a data output apparatus for taking all element data into a computer, editing them in the computer and transforming them into halftone dot images to be formed on printing plates in the step of producing image data to be used for making the printing plates.

More particularly, the present invention relates to a coded data output apparatus for producing coded data to be used for forming dot code images to a plate making apparatus, which by turn produces printing plates carrying dot code images to be printed on printing media to make the data in the images optically retrievable regardless of the type of data, be it audio data for voice and music, video data obtained by way of cameras and other pieces of video equipment or coded digital data produced by personal computers, word processors and other data processing apparatus. In short, a coded data output apparatus according to the invention is adapted to multimedia applications.

Conventional media for recording voice and music include magnetic tapes and optical discs. However, recorded copies in the form of tape cassettes and optical discs are considerably expensive and offered with high unit prices if recorded on a mass recording basis. Additionally, large space is typically required for storing tape cassettes and optical discs. Furthermore, the transport of such recording media is time consuming and costly by any means particularly when they are mailed or shipped to remote areas.

This is true not only for audio media but also for video media that carry video images produced by cameras and other pieces of video equipment and media that carry coded digital data obtained from computers and word processors. In short, the so-called multimedia flow of information faces this problem.

In an attempt to solve this problem, EP 0,670,555 A1 (which corresponds to U.S. Ser. No. 08/407,018 filed by the assignee of the present invention) proposes a system for recording data in the form of a two-dimensional pattern of coded dots produced as a coded data image by two-dimensionally arranging a plurality of dots that can be transmitted by facsimile and reproduced into a large number of copies at low cost regardless of the type of data, be it audio data, video data or coded digital data to make it adapted to multimedia applications, and also a system for retrieving the data from the image.

According to the data format employed in the above system for coded dot data of two-dimensional patterns, a dot code pattern comprises a plurality of blocks arranged vertically and horizontally for two-dimensional arrangement and each of the blocks contains a marker, a block address and a data area for storing data for address error detection and error correction and actual data.

EP 0,7171,398 A2 (which corresponds to U.S. Ser. No. 08/571,776 filed by the assignee of the present invention) discloses a format for improving the density of recording coded dot data as will be described below by referring to FIG. 1 of the accompanying drawings. Referring to FIG. 1 and according to the above identified invention, pattern dots 278 are arranged between any adjacently located markers 174 in the first direction, while address dots 280 are arranged between any adjacently located markers 174 in the second direction. Each of the pattern dots 278 and address dots 280 has a size equal to that of a data dot 282 to be arranged in a data area 180. With such an arrangement for dot codes 170, the center of the marker 174 that provides a reference point for directionally determining the arrangement and reading data dots 282 can be identified easily and accurately by means of a set of pattern dots 278 having a predetermined pattern so that the original data can be retrieved without fail for multimedia applications.

Pattern dots, 278, address dots 280 and data dots 282 typically have a size of tens of several micrometers that may be 63 µm for example, although the size may be reduced to several micrometers depending on the application. While a number of techniques have been proposed to enhance the quality of bar codes including Japanese Patent Application KOKAI Publication No. 5-15911 that discloses a technique of accurately detecting and controlling the inclination of a bar code printing head in order to prevent degradation in the printing quality that can be given rise to when an inclined head is used for printing and Japanese Patent Application KOKAI Publication No. 5-54165 that teaches a bar code printing method with a printer having a low resolution, no comparable techniques have been available for dot code printers that are required to print dot codes having a very fine dot arrangement with a very high level of positional accuracy.

On the other hand, the technique of desktop publishing (hereinafter referred to as DTP) for producing originals of documents and images prepared by computers for printing. The DTP output is examined for correction, if necessary, by means of a monitor and then directly printed on a film to produce a printing plate by means of an image setter.

Thus, DTP can be applied to the coded data output apparatus for producing coded data to be used for forming dot code images to a plate making apparatus, which by turn produces printing plates carrying dot code images to be printed on printing media to make the data in the images optically retrievable for multimedia applications if they are very finely drawn and the dots are required to show a very high degree of positional accuracy.

Referring to FIG. 2A, data to be coded into dots for multimedia applications are fed to a computer 102 by way of an input apparatus 100 and then the computer 102 transforms the data into image data by referring to the compression format, the error correction format, the dot code format and other reference data stored in an external memory 104 and transmits the image data to an image setter 106, which constitutes a printing plate preparing system along with a printing plate exposure apparatus 108. Subsequently, the printing plate preparing system prints a dot code image on a film, which is then exposed to light to make a printing plate. The produced printing plate is then put on a printing machine 110 to produce copies of a printed matter that carries dot codes.

Alternatively, a printing plate may be prepared without using a film as illustrated in FIG. 2B.

However, the above arrangement of preparing a printing plate cannot and should not simply use the DTP output because the configuration of dot codes have to be optimized for multimedia applications by taking the environment of handling dot codes into consideration, although the optimization of dot code configuration has not been discussed to date.

BRIEF SUMMARY OF THE INVENTION

In view of the above described circumstances, it is therefore the object of the present invention to provide a coded data output apparatus that can output a set of dot codes having an optimized configuration to make them adapted to the environment where they are used.

According to the invention, the above object is achieved by providing a coded data output apparatus for producing an image data, including dot coded data, out of multimedia-data containing at least one of audio data, video data and coded digital data, and supplies the image data to a plate making apparatus which is used to print the image data onto printing medium as optically readable dot codes, comprising: image acquisition means for inputing or generating data as an image of a dot code to be printed to acquire image data; resolution parameter specifying means for specifying parameter data relating to the resolution of the image data acquired by the image data acquisition means; resolution parameter modifying means for modifying the resolution-related parameter data specified by the resolution parameter specifying means according to the resolution-related characteristics of the plate making apparatus; and image data output means for outputting image data acquired by the image acquisition means to the plate making apparatus in accordance with the resolution-related parameter data modified by the resolution parameter modifying means.

Thus, with a coded data output apparatus according to the invention, the resolution-related parameter data specified by the resolution parameter specifying means are modified by the resolution parameter modifying means according to the resolution-related characteristics of the plate making apparatus and the image data for a dot code image are output by the image data output means to the plate making apparatus in accordance with to the modified resolution-related parameter data. Consequently, since the coded data output apparatus is provided with a function of specifying a resolution for the dot code image to be output according to the resolution specific to the plate making apparatus, optimally coded dot data that are free from distortions due to resampling can be produced by the coded data output apparatus.

Additional objects and advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 2A and 2B are block diagrams of two conventional coded data output apparatus for producing data for a dot code image to be printed for multimedia applications to which DTP is applied.

FIGS. 7A through 7D are schematic illustrations showing the 5C, 4S, 4C and 3S pixel arrangements respectively.

FIG. 8 is a schematic illustration of a pixel configuration table to be used for the resolution parameter modifying section of the embodiment.

FIG. 9 is a schematic illustration of a dot arrangement to be used for the purpose of the invention.

FIGS. 10A through 10D are schematic illustrations showing different dot contours.

FIG. 11 is a graph showing the relationship between the percentage of the dot area and the occurrence rate of code reading errors.

FIG. 12 is a schematic illustration of dots having an ideal area percentage.

FIG. 13 is a schematic illustration showing the positional relationship between the center of a marker and that of a dot.

FIGS. 14A and 14B are schematic illustrations showing how the coordinates of the center of a marker is transferred.

FIGS. 15A and 15B are schematic illustrations showing the limit for the number of blocks that can be read at a time.

FIGS. 16A and 16B are schematic illustrations showing the ratio of the size of a printed dot to that of a pixel of an image pick-up device.

FIG. 17 is a flow chart of the operation of the resolution parameter modifying section of the embodiment.

FIGS. 18A through 18C are schematic illustrations showing the operation of the image data output section of the embodiment in terms of the relationship between the direction along which pixels are arranged and the longitudinal direction of arranged dot codes.

FIGS. 19A through 19C are schematic illustrations also showing the operation of the image data output section of the embodiment in terms of the relationship between the direction along which pixels are arranged and the longitudinal direction of arranged dot codes.

FIG. 20 is a flow chart of the authoring operation of the image data input or generation section of the embodiment.

DETAILED DESCRIPTION OF THE INVENTION

Now, the present invention will be described in greater detail by referring to the accompanying drawings that illustrate a preferred embodiment of the invention.

Figure 3:
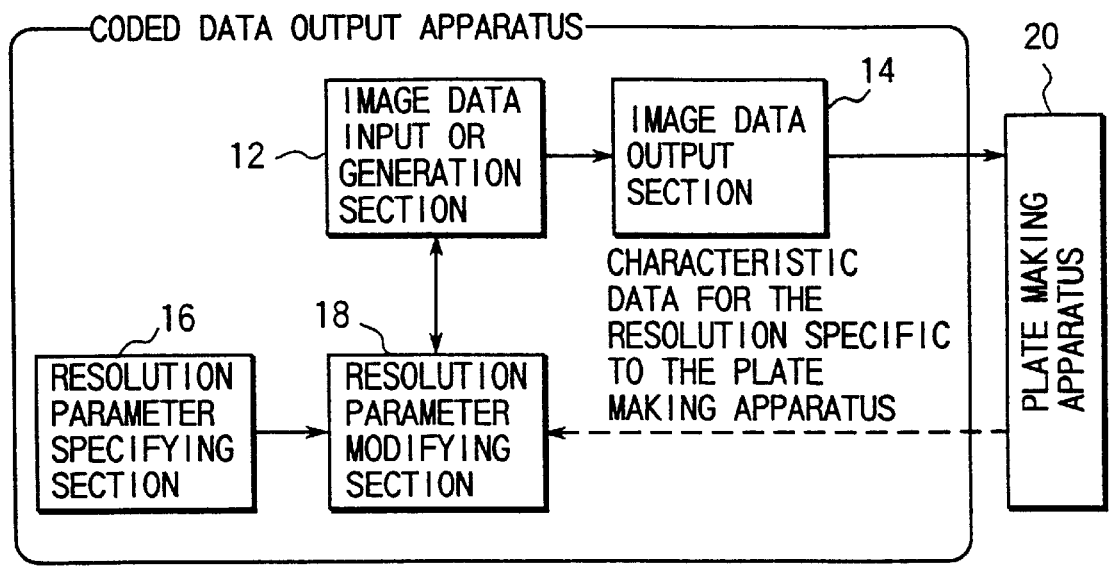
FIG. 3 is a block diagram of a preferred embodiment of the invention.

FIG. 3 is a block diagram of the preferred embodiment. A coded data output apparatus 10 produces an image data, including dot coded data, out of multimedia data containing at least one of audio data, video data and coded digital data, and supplies the image data to a plate making apparatus 20 which is used to print the image data onto printing medium as optically readable dot codes.

The plate making apparatus 20 prints a dot code image, which is a raster image, on a film or directly exposed to light to make a printing plate. (If the image is formed on a film, the image has to be transferred onto a printing plate, which is then exposed to light.) Thus, the plate making apparatus 20 corresponds to the image setter 106 and the plate making apparatus 108 of FIG. 2A and also to the plate making apparatus 108 in FIG. 2B.

On the other hand, the coded data output apparatus 10 corresponds to the input apparatus 100, the computer 102 and the external memory 104 in FIG. 2A or FIG. 2B and comprises an image data input or generation section 12, an image data output section 14, a resolution parameter specifying section 16 and a resolution parameter modifying section 18.

The image data input or generation section 12 operates to input coded image data prepared by an external dot code preparing apparatus or the like (not shown) or encode multimedia data to be entered into codes to generate image data of the codes.

The image data output section 14 transforms coded image data into those with a format that can be recognized by the image setter 106 or the plate exposure apparatus 108 and sends them out.

The resolution parameter specifying section 16 specifies parameters necessary for generating coded images that provide dot codes with a desired size on a printed matter that is a final output of the apparatus. For example, the parameters to be used for the purpose of the invention include the size of each dot of dot codes and the number of pixels to be used for forming a dot and the resolution. The resolution is used to indicate of the size of each pixel for forming a coded image on the image setter. Typically, the resolution is expressed in terms of the number of pixels per inch or dpi (dot per inch).

The resolution parameter modifying section 18 modifies the parameters specified by said resolution parameter specifying section 16 according to the data characteristic to the plate making apparatus 20 to be used with the coded data output apparatus 10. For example, if the resolution specified by the resolution parameter specifying section 16 does not agree with that of the image setter, it respecifies the resolution to make it agree with that of the image setter.

More specifically, the coded data output apparatus 10 provides the dot code image to be printed with a specific format such as TIFF format before the corresponding image data coming from the image data input or generation section 12 are transmitted to the plate making apparatus 20 and have the image data output section 14 transform it into a format such as a postscript format. With this arrangement, the image can become distorted by the resampling operation if the resolution of the image data does not match that of the plate making apparatus 20. In order to prevent such distortion, the image data have to be made to match the resolution of the plate making apparatus 20 that is specific to the latter by using characteristic data on the resolution of the latter.

The image setter 106 can show a resolution specific to it and different from those of other image setters. Therefore, the resolution of an image setter can vary between 2,400 dpi and 3,000 dpi of beyond them. If the data transmitted to the image setter 106 corresponds to straight line consisting of 10,000 pixels, they covers a stretch of about 106 mm if the resolution is 2,400 dpi and about 85 mm if the resolution is 3,000 dpi. Thus, the finally produced images may show varied sizes if no specific arrangements are provided for the resolution.

Assume here that a resolution of 2,400 dpi is specified by way of the computer 102 of the coded data output apparatus 10 to draw a broken line with 10,000 pixels including 5,000 black pixels and 5,000 white pixels arranged alternately in a sequence of a white pixel, a black pixel, a white pixel, a black pixel, . . . The computer 102 tries to produce an output for an about 106 mm long broken line where each line segment and each white interval have a length of 10.6 µm. However, if the image setter 106 receiving the output has a resolution of 3,000 dpi, it can only produce a broken line where each line segment and each white interval have a length of 8.5 µm to make the total length of the broken line equal to 85 mm. Then, the coded data output apparatus cannot produce the intended image because the image is dimensionally significantly altered.

Figure 4:
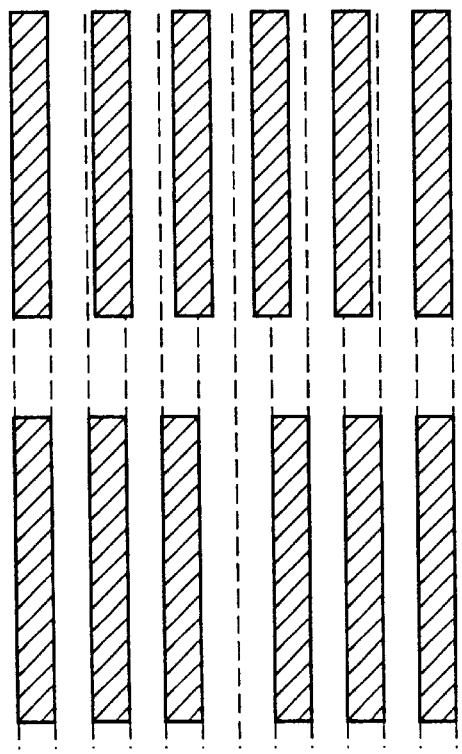
FIG. 4 is a schematic illustration of a resampling operation to be conducted for the purpose of the invention.

The computer 102 can alternatively provide an output with a different number of pixels to draw the image having the intended size. Thus, the computer 102 can choose either an image with the intended size or a constant resampling size. If an image with the intended size is chosen and an output for the image is produced, then, the 10,000 pixels are resampled to replace the 10,000 pixels by 12,500 pixels, which consequently give rise to a distorted image as shown in FIG. 4. Referring to FIG. 4, although the computer tries to produce an output for black and white bars arranged alternately at regular intervals as shown in the upper half of FIG. 4, the output inevitably produces bars that are arranged at irregular intervals.

Finely defined codes such as dot codes are required to be free from distortions due to resampling. In the case of a situation where the present invention is applied for producing dot codes with a dot pitch of about 63 µm by means of an image setter 106 with a resolution of 2,400 dpi, the interval separating two adjacent dots is constituted by 6 pixels. Conversely, for outputting a dot code with a dot pitch of 60 µm, an output apparatus that can provide pixel pitches adaptable to all the common divisors has to be used and the image setter 106 is required to have a resolution of 2,540 dpi.

Now, the operation of the resolution parameter modifying section 18 will be described below.

Firstly, the process of optimizing the dot code as a function of the necessary conditions for reading data will be described.

If, for example, an image pick-up device such as CCD is used to read coded data in the form of bar codes that are arranged with an interval of T, the image is projected on the focal plane of the CCD periodically with a period of TM, where M is the optical magnification.

In order for the coded data to be read without fail with the period of TM, it will be understood from the sampling theorem that the CCD pixel interval X needs to be smaller than TM. However, the CCD pixel interval X is required to satisfy the requirement below in order to make the bar code readable if tilted by 45° in order to make it adapted to situations where the bars and the pixel arrangement of the CCD are accidentally rotated.

$$X < \frac{TM}{2}\sqrt{2} \text{ or}$$

$$X < \frac{TM}{\sqrt{2}}$$

On the other hand, in the case of dot codes to which the present invention is applied and where data are expressed by dots, the CCE pixel interval X is required to satisfy the requirement expressed below by using the dot pitch T in view of the fact that the area occupied by dots is smaller than a half of the area of the pixels if the center of each dot is covered by a pixel.

$$X < \frac{TM}{2}\sqrt{\frac{\pi}{2}}$$

or $$X < TM \times 0.63$$

Figure 5:
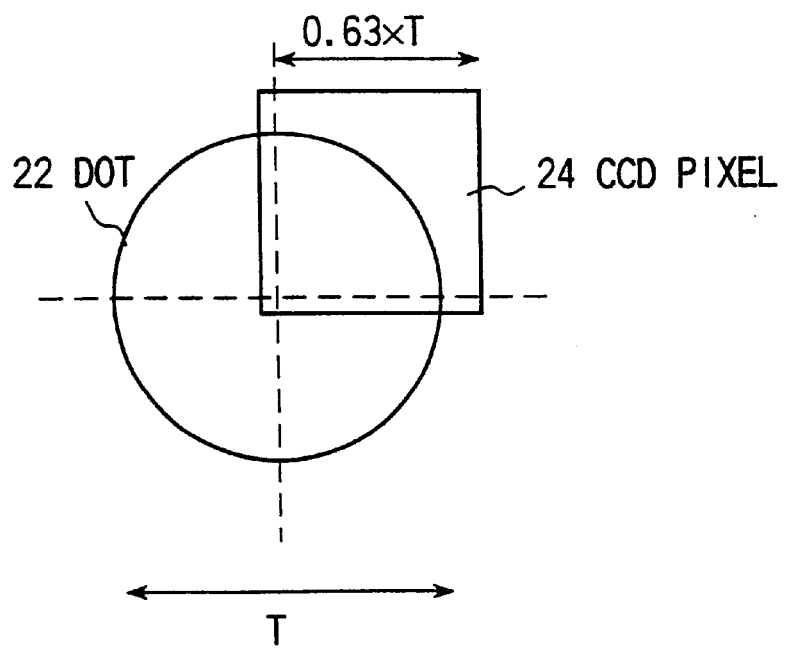
FIG. 5 is a schematic illustration of the relationship between the dot pitch and the CCD pixels to be used for the purpose of the invention.

Thus, if squares (that correspond to CCD pixels), each having a size of 0.63 times of the dot pitch T and being arranged to cover the center of a dot 22, are arranged in a manner as shown in FIG. 5, more than 50% of the surface area of each of the CCD pixels is occupied by a dot 22.

The numerical value of 0.63 represents an ideal situation where dots 22 are true circles having a diameter equal to the pitch of arrangement of pixels, although the arrangement may be subjected to more harsh requirements due to the profile of the medium where dot codes are formed and the complexity of the process of forming dot codes (due to factors including the state of the ink and that of the toner if they are formed by printing). Thus, it will be necessary for the sampling operation to provide a pixel interval smaller than a half of the dot pitch on a plane where the image is picked up in order for the dot codes to be read correctly.

Figure 1:
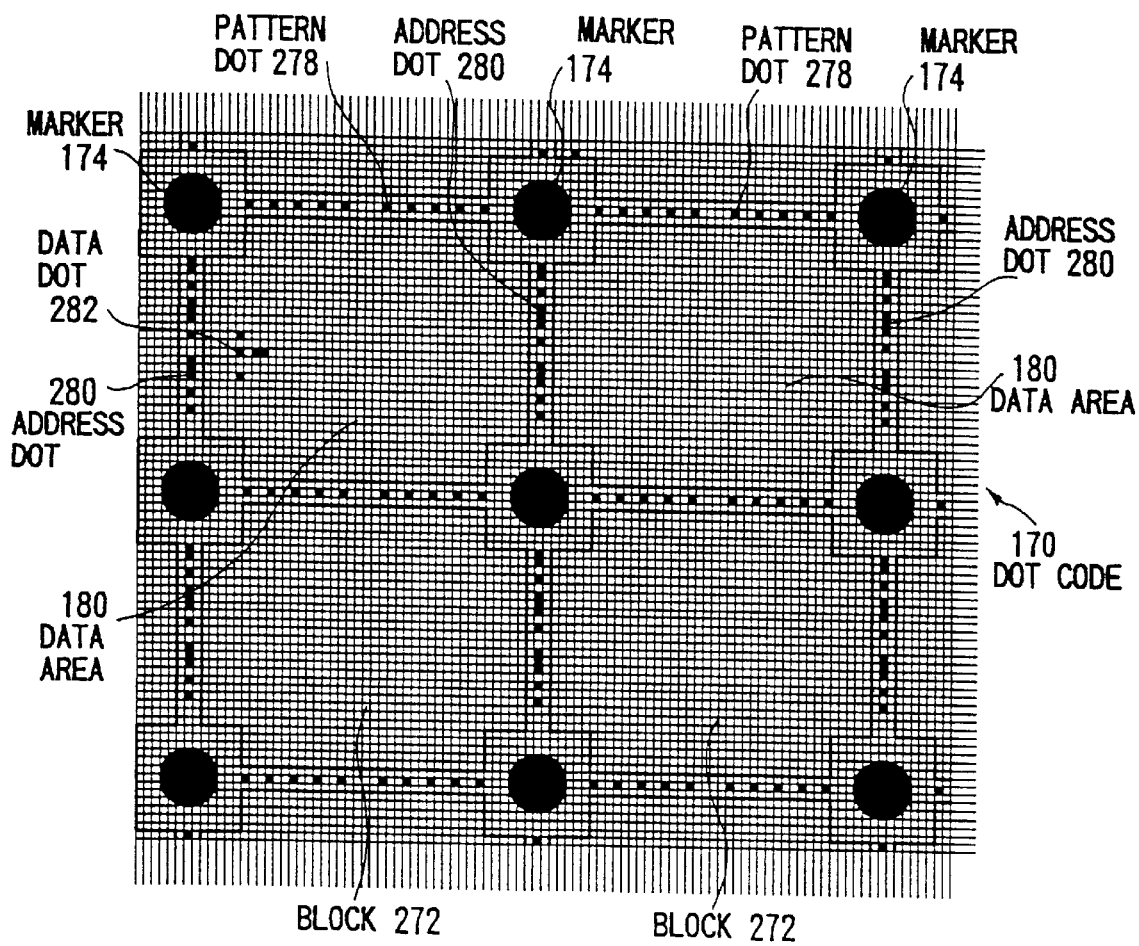
FIG. 1 is a schematic illustration of a known two-dimensional code pattern of dot codes.

On the other hand, dot codes for which this embodiment is used are based on square blocks 272 provided with markers 174 arranged at all the four corners as shown in FIG. 1 and read on a block by block basis. A dot code is formed by a plurality of blocks arranged continuously and two-dimensionally. Thus, the dot code image taken by the CCD desirably contains at least a block 272. In other words, all the dots including the markers that are contained in a block have to be found in the picked up image. Additionally, in view of the operation of processing all the blocks of a dot code taken up by scanning, it will be understood that the larger the number of blocks taken by a single image pick-up operation, the more advantageous from the viewpoint of scanning speed.

All in all, the dot pitch T is preferably not greater than 5 pixels for the CCD. A greater number may not feasibly be used.

Under the above described conditions, the dot pitch T can be defined as follows in terms of the distance of n minimum pixels of an image setter with a resolution of R [lines/mm].

$$\frac{2RX}{M} < n < \frac{5RX}{M}$$

The resolution parameter modifying section 18 modifies the dot pitch so as to make it satisfied the above requirement.

Now, the configuration of each dot of a dot code will be described.

Figure 6A:
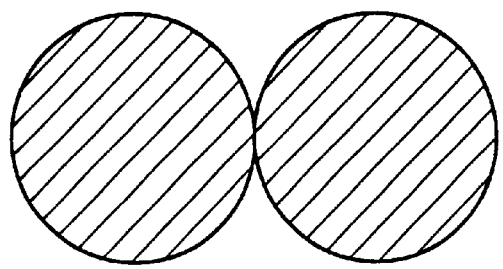
FIG. 6A is a schematic illustration of an ideal arrangement of dots, where dots are located in close contact with each other.
Figure 6B:
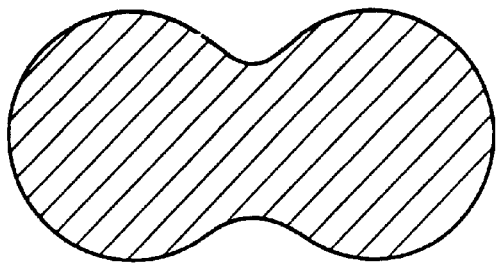
FIG. 6B is schematic illustration of an undesired arrangement of dots, where dots are located too close to each other and the boundary is blurred with ink.

Since a dot code is realized by arranging dots at a high pitch, they are ideally so arranged that any two adjacent dots are held in close contact with each other as shown in FIG. 6A. However, when dot codes are formed by printing, each dot can become blurred as in FIG. 6B if adjacent dots are in contact with each other so that they may not be correctly read. The ink can flow out into white areas to produce black areas, which may then be mistaken for dots with a considerably high probability.

Therefore, it is desirable that dots are completely, separated from other on the printing plate. Differently stated, dots preferably have a diameter smaller than the dot pitch rather than a diameter equal to the dot pitch (which will be referred to as ideal diameter hereinafter).

Additionally, each dot ideally is a true circle, although it is impossible to draw a true circle from the viewpoint of the resolution of the image setter because a dot is formed by pixels with a size of about 10 $\mu$m.

While the above arrangement may provide a satisfactory resolution for an image that is observed under ordinary conditions, dot codes to which the present invention is applicable have a size between 50 and 60 $\mu$m and hence a minimum pixel of 10 $\mu$m is not satisfactory in terms of resolution.

In order to cope with this problem, the present invention proposes a circle approximately drawn by a set of minimum pixels. FIGS. 7A through 7D illustrate show how dots are formed at a pitch of 5 pixels. Note that each of the circles in these figures represents the contour of an ideal dot and each of the hatched squares represents a pixel in output apparatus.

In FIG. 7A, the dot has a size of five pixels, which is equal to the diameter of the ideal dot. This arrangement will be referred to as 5C-type pixel arrangement because the pixels at the four corners of the square corresponding to the circle are removed to make the contour closer to the true circle.

With the 5C-type pixel arrangement, any attempt to reproduce the dot with ink will result in a blurred dot where ink flows into the adjacently located dots and also into white areas surrounding the contact points of the dot. Then, the average size of the printed dots is enlarged to give rise to a high under-error rate.

Under-error as used herein refers to an error of mistaking a white non-dot area for a dot, which is observed frequently when the produced final image suffers from under-exposure and the image is dominated by a dark tone.

Conversely, an error of not detecting one or more than one dots because of a pale image is referred to as over-error.

In FIG. 7B, the dot has a size of four pixels or a square form realized by 4×4 pixels. This arrangement will be referred to as 4S-type pixel arrangement.

Similarly, FIG. 7C shows a 4C-type pixel arrangement and FIG. 7D shows a 3S-type pixel arrangement.

Of these arrangements, the 4S-, 4C- and 3C-type pixel arrangements provide dots that do not interfere with each other, the dot size being diminished in the above mentioned order.

On the other hand, the image setter exposes the film to laser beams and, therefore, the size of pixels for forming dots can be varied as the beam diameter changes. If, for example, a laser beam having a relatively large diameter is used at a high intensity for exposure, the photochemically developed pixels are apt to show a large diameter. More specifically, if the image setter 106 draws a spot on a film and has a resolution of 2,400 dpi, the film is supposed to show a spot with a diameter of 10.6 $\mu$m when developed. However, the spot can become as large as 12 $\mu$m if a blurred beam is used and/or the developing solution is not agitated sufficiently for development or has been deteriorated by use. In general, while efforts are paid to regulate the image setter 106 into optimal conditions in order to avoid such situations in the output center, no standards have been provided for the regulating operation and various techniques for determining the photosensing characteristics of the film and regulating the image developing conditions are currently tried on an ad hoc basis.

Thus, if a same original and an image setter having a standardized resolution are used, the obtained final output images can show varied tones and different pixel sizes.

In order to cope with this problem, this embodiment is designed to determine if the image setter (plate making apparatus 20) tends to enlarge or diminish pixels on the basis of the data characterizing the performance of the image setter and, if it tends to enlarge pixels, it choose a pixel arrangement that produces small dots.

This operation of choosing an optimal pixel arrangement is carried out by the resolution parameter modifying section 18, for example, using a table as illustrated in FIG. 8. The table is designed for use when dot codes are formed with a dot pitch of about 60 µm.

Parameters including the different resolutions of the image setter such as 2,400 dpi, 2,540 dpi and 3,000 dpi are fed from the resolution parameter specifying section 16 to the resolution parameter modifying section 18. If the resolution of 2,540 dpi is used for a dot pitch closest to 60 µm, the resolution parameter modifying section 18 feeds the image data input or generation section 12 with the parameters necessary for producing dots with the dot pitch of 60 µm and the 5C-type pixel arrangement. Likewise, the dot pitch of 63.5 µm that is closest to 60 µm and the 5C-type pixel arrangement are used for the resolution of 2,400 dpi, whereas the dot pitch of 59.3 µm and the 6C-type pixel arrangement are used for the resolution of 3,000 dpi and fed to the image data input or generation section 12.

If, however, the image setter or the plate making apparatus 20 tends to produce larger pixels for some reason or other, then the embodiment determines the tendency on the basis of the data characterizing the performance of the plate making apparatus 20 and switches to the 4S-type pixel arrangement for 2,400 dpi or 2,540 dpi. If the tendency of producing larger pixels continues, the embodiment further switches to the 4C-type pixel arrangement.

Various techniques may be used for determining if the dots output from the image setter tend to grow. For instance, a reference pattern may be printed on a margin that is removed from the printed final product so that it may be referred to in order to determine if the tendency of growing dots exists or not. Note that the reference pattern includes small dots for determining how the smallest pixel unit.

Now, the dot size will be described.

Ideally, data are taken in with the smallest possible number of pixels without error when the CCD sampling is conducted with the dot size of a half of the dot interval. However, the size will have to be made smaller in most cases because the CCD sampling becomes short of number if the size is greater than a half of the dot interval but the problem of a reduced allowable amount of data arises as will be described hereinafter if the CCD pixel aperture is reduced (in relative terms, although the CCD pixels do not vary and therefore the dot size increases if the CCD pixels are unvaried). In other words, it is advantageous to use a relatively small dot size. The CCD sample interval has a limit of a half of the dot size, provided that data can be taken in with the smallest possible number of pixels.

On the other hand, in order for dot data taken in with a CCD pixel aperture equal to a half of the dot interval to be optically resolved, each dot has to have an area not smaller than a half of the aperture. In other words, in FIG. 5, the CCD pixel 24 is not determined to be black unless the dot occupies more than half of the area of the pixel 24.

Referring to FIG. 9, each square defined by four tangent lines separating adjacently located pixels is referred to a dot existing area hereinafter. Then, each dot area contains a dot.

Now, referring to FIG. 10A, if dots are arranged at an interval of five pixels and each dot is formed with 3×3 pixels (note that each square in FIGS. 10A through 10D represents a pixel of the image setter), each dot takes 36% of the corresponding dot existing area (hereinafter to be expressed as a dot area percentage of 36%).

If the dots are printed accurately for codes or, more specifically, if the film produced accurately by the image setter is accurately copied on a printing plate and the printing operation is conducted accurately by means of the printing plate, dots of 3×3 pixels will be accurately reproduced by printing. The dots will not be resolved, however, if they are sampled by a CCD with a sampling pitch equal to a half of the dot pitch. In other words, these dots cannot be used for codes with the above arrangement.

However, there can be cases where codes are read with the above arrangement if the film is exposed to a beam that tends to grow or the dot diameter tends to grow due to underexposure at the time of copying the film on the printing plate until the dot area percentage exceeds 50% as shown in FIG. 10B. In shorts, dot codes are read correctly if the dot area percentage exceeds 50% in the final printed matter that carries codes.

On the other hand, the dot area percentage is 48% with the 4C-type pixel arrangement as shown in FIG. 10C. However, if dots grows in the above described manner, the dot area percentage can rise to about 80% as shown in FIG. 10D, where dots can interfere with each other to raise the code reading error rate.

FIG. 11 is a graph showing the relationship between the dot area percentage and the code reading error rate.

As seen from the graph, the reading error rate is low when the dot area percentage is found between about 50% and about 80% and minimized when the dot area percentage is about 60%. Thus, while the dot of FIG. 10A may not be read because of its poor dot area percentage but it becomes readable when it grows to show a dot area percentage of about 50% as shown in FIG. 10B. On the other hand, if a dot is formed with a dot area percentage of 50% as shown in FIG. 10C without expecting a growth on the part of the dot, the dot may grow until the area percentage exceeds 80% and become unreadable as shown in FIG. 10D.

As described above, the reading error rate is minimized when the dot area percentage is about 60%. Dots with this ideal area percentage have a diameter equal to 0.88 of the dot interval as shown in FIG. 12. Thus, the resolution parameter modifying section 18 selects a pixel arrangement from the table of FIG. 8 in such a way that the final output shows dots with an area percentage closest to this ideal value.

Now, the shift of the center of marker 174 will be described.

A dot code to which the present invention is applicable is constituted by data dots 282 having a configuration as described above and a marker 174 far greater than each data dot 282. The marker 174 has a diameter equal to five times of the dot pitch or 25 pixels and the coordinates of the center thereof has to be phase-matched with those of the center of each data dot 282.

FIG. 13 is an illustration showing the relationship between the marker 174 and the data dot 282. Referring to FIG. 13, the straight lines of the lattice-like pattern defines pixel cells of the image setter. Thus, the marker 174 and the data dot 282 are quasi-circles formed with pixel cells.

Assume here that the data dot 282A has the 3S-type pixel arrangement. As seen from the drawing, the center of the pixel located at the center of the group of pixels that form the data dot agrees with the center of the dot. Thus, the coordinates of the center of the marker 174 having a diameter equal to that of a quasi-circle of the 25 pixels that is an odd number of times of the size of each pixel and the coordinates of the center of the data dot 282A with the 3S-type pixel arrangement are phase-matched, the center of each circle being indicated by a white spot in FIG. 13.

On the other hand, if the data dot 282B has the 4S-type pixel arrangement, the center of the group of pixels that form the data dot is located on a boundary line separating adjacent pixels. Therefore, the center of the data dot 282A and that of the data dot 282B are displaced by a half of the size of a pixel and hence the coordinates of the center of the marker and those of the center of the data dot 282B are not phase-matched.

Thus, if the data dot 282 has a diameter equal to an even number of times of the size of a pixel as in the case of the 4S-type pixel arrangement, the marker having a diameter equal to an odd number of times of the size of a pixel has to be displaced by a distance of a half of the pixel size both in the X- and Y-directions in order to place the center of the marker 174 on a boundary line. The resolution parameter modifying section 18 of this embodiment modifies the marker illustrated by a white area and hatched areas in FIG. 14A to show a contour as illustrated in FIG. 14B, where the center of the marker is located on a boundary line. The contour as illustrated in FIG. 14B corresponds to a white area and black areas in FIG. 14A.

Now, the number of blocks that can be read within a screen will be described.

If the image pick-up apparatus has a screen with X- and Y-directional dimensions equal to Nx pixels and Ny pixels respectively and dot codes are read by scanning the camera in the Y-direction at a rate of Nf frames per second in such a way that each block occupies Bx and By pixels in the X- and Y-directions respectively in the image pick-up apparatus, the number of blocks taken up in a frame will be Nx/Bx in the X-direction and Ny/By in the Y-direction.

However, with dot codes to which the present invention is applicable, each block will not be successfully read if the entire block is entirely projected on the screen.

To satisfy the above condition, the number of blocks that can be read in a frame will be int(Nx/Bx)–1 in the X-direction and int(Ny/By)–1 in the Y-direction, where "int" represents a function for producing an integer by discarding the fraction of the argument.

Referring to FIG. 15A, the hatched area corresponds to the area taken by the CCD and each circle represents a marker 174. Thus, a pair of blocks 722 are found in the image pick-up area 26 of the CCD and, therefore, these two block are read.

To the contrary, if the dot code has a large area, it can overflow from the CCD image pick-up area 26 as shown in FIG. 15B. In the case of FIG. 15B, there is no block that has four markers arranged at the four corners and located within the image pick-up area 26 and hence no block can be read.

Therefore, each dot code has to be defined in terms of the block size in such a way that an entire block can be projected on the CCD screen. In this embodiment, the resolution parameter modifying section 18 operates to define the dot interval so as to maximize the number of blocks projected on the screen.

Now, the relationship between the embodiment and the medium for carrying the final output will be described.

Generally, the profile of each printed dot on the medium varies depending on the type of the medium, which can be paper or film. If dots are printed on a sheet of paper, they tend to grow. If they are printed on sheet of film, a seal or a sheet of coated paper, the printed dots will not grow because the ink would not permeate. Thus, the resolution parameter modifying section 18 can modify the dot arrangement depending on the type of the medium, taking the possibility of dot growth into consideration.

Now, the relationship between the embodiment and the aspect ratio of the image pick-up apparatus will be described.

CCDs generally do not carry out the sampling operation for a square. For example, NTSC system cameras have an aspect ratio different from that of a square. If the sampling operation is carried out in an area that is not a square, the picked up image will inevitably be distorted. If a round dot is picked up by a CCD having an aspect ratio of 3:2, a flat image is reproduced on the screen as shown in FIG. 16A because the pixels of the dot are sampled at a rate of 3 horizontally and 2 vertically.

In this embodiment, the resolution parameter modifying section 18 specifies the dot shape and the dot interval in such a way that the they are optimized when dot codes are picked up with the aspect ratio of the image pick-up apparatus. In other words, an elliptical shape and a corresponding dot interval is specified for dots as shown in FIG. 16B.

FIG. 17 is a flow chart of the operation of the resolution parameter modifying section 18.

Firstly, an approximate dot pitch is selected (step S10) and then the resolution of the image setter is manually input (step S12). Data characteristic of the image setter such as the tendency of growing or slimming dots are input (step S14).

Then, the resolution parameter modifying section 18 determines an optimal pixel arrangement including the number of horizontally arranged pixels, that of vertically arranged pixels and the dot pitch by referring to the pixel arrangement table 28 (step S16). Finally, if the coordinates of the center of the markers are displaced and hence has to be corrected, an optimal pixel arrangement is determined also for the markers by referring to the target pixel table 30 for marker correction (step S18).

Now, the operation of the image data output section 14 will be described.

Firstly the directions along which pixels are arranged and the longitudinal direction of dot codes show a relationship as will be described below.

FIG. 18A shows dot codes printed in an ordinary manner, where the direction of pixel arrangement agree with the longitudinal direction of dot codes. If dot codes are printed aslant as shown in FIG. 18B, the resampling operation will be adversely affected as described earlier.

To cope with this situation, the image data output section 14 of the present embodiment produces an output for obliquely arranged dot codes by shifting the rows of blocks without shifting the direction of block arrangement as shown in FIG. 18C so that consequently the pixel arrangement defined by the image data input or generation section 12 agrees with the pixel arrangement fed to the plate making apparatus 20 (image setter).

Alternatively, the image data output section 14 may keep the slanted original dot code arrangement but enlarge the dot codes only to such an extent that they are not adversely affected by resampling. In other words, the effect of resampling can be reduced by increasing the number of dot resampling and, therefore, dot codes are enlarged to that end by determining an optimal magnification through arithmetic operations.

FIGS. 19A through 19C illustrate examples where the direction of dot code arrangement and that of pixel arrangement of the image setter are not in parallel with each other. While bar codes are used in the drawings for the purpose of simplification, the underlying idea is applicable to dot codes without any modification.

FIG. 19A illustrates the positional relationship between codes and the pixel array of the image setter. In FIG. 19A, the broken lines shows the longitudinal direction of the pixel array of the image setter and the black blocks are used for codes (note that the width of each of the black block for codes is equal to the resolution of the image setter). FIG. 19B shows a typical result of resampling carried out for the codes of FIG. 19A by the image setter. As shown, the black blocks for codes are distorted almost by a half of the width of each black block. If the black blocks are arranged in parallel with the pixel arrangement of the image setter, the codes may be reproduced without distortion. FIG. 19C shows an example of resampling with a doubled rate, keeping the positional relationship between the pixel array and the black blocks. The distortion is limited to a quarter of the width of each black block in this example.

If, for instance, the code reading apparatus can read codes correctly up to a distortion level equal to a quarter of the width of each black block, the distorted codes can be accommodated by doubling the code resampling rate. In other words, no reading error will occur if the codes are enlarged to a double size for printing.

Finally, the authoring operation of the image data input or generation section 12 will be described by referring to FIG. 20.

If audio data are compressed to dot codes for printing, the space that can be allocated to codes in a printed matter may be limited when letters, pictures and graphs are also printed there. Then, the editor will have to decide the layout for allocating space to dot codes.

If such is the case, the size of dot codes has to be known in the step of DTP operation because the length of dot code can vary depending on the amount of input data to-be coded into dots. The operation of coding into dots including a data compression process takes time and, therefore, the size of dot codes has to be approximately calculated to determine the layout before the completion of the coding operation including a data compression process.

To assist the layout operation, as data are input (step S20), the amount of data is determined by arithmetic operations (step S22). At this time, the resolution parameter modifying section 18 receives data on the resolution of the plate making apparatus 20 (step S30) to determine the dot interval in a manner as described earlier (step S32). Then, the image data input or generation section 12 determines the size of dot codes on the basis of the computed amount of data and the determined dot interval (step S24).

The present invention is applicable not only to the operation of making a printing plate but also to the operation of a printer if a printer having a satisfactory resolution is developed in future, although such a printer is not currently available. Then, the dot code arrangement may be optimized for the printer by means of the computer so that dot codes may be directly printed out from the printer.

While the present invention is described in detail by way of a preferred embodiment, the present invention is not limited thereto by any means and it may be modified and/or applied in various ways without departing from the scope of the invention.

Now, the present invention will be summarized as follows.

(1) A coded data output apparatus for producing an image data, including dot coded data, out of multimedia data containing at least one of audio data, video data and coded digital data, and supplies the image data to a plate making apparatus which is used to print the image data onto printing medium as optically readable dot codes, comprising:

image acquisition means for inputing or generating data as an image of a dot code to be printed to acquire image data;

resolution parameter specifying means for specifying parameter data relating to the resolution of the image data acquired by the image data acquisition means;

resolution parameter modifying means for modifying the resolution-related parameter data specified by the resolution parameter specifying means according to the resolution-related characteristics of the plate making apparatus; and image data output means for outputting image data acquired by the image acquisition means to the plate making apparatus in accordance with the resolution-related parameter data modified by the resolution parameter modifying means.

Thus, the coded data output apparatus is capable of specifying a resolution for the coded image data to be output according to the resolution of the plate making apparatus so that dot codes can be output under optimal conditions and without distortions due to resampling.

(2) The coded data output apparatus according to (1), wherein the resolution parameter modifying means includes pixel arrangement specifying means for specifying a pixel arrangement for pixels to be assigned to each dot constituting the smallest data unit in dot codes to be printed on the printing medium according to the resolution-related characteristics in order to modify the parameter data relating to the resolution and specified by the resolution parameter specifying means and dot interval specifying means for specifying the dot interval for dots constituting the smallest data unit in dot codes to be printed on the printing medium according to the resolution-related characteristics.

Thus, the dot interval and the pixel arrangement for pixels to be assigned to each dot constituting the smallest data unit in dot codes can be optimized simultaneously according to the resolution of the plate making apparatus.

(3) The coded data output apparatus according to (2), wherein the pixel arrangement specifying means further includes a reference table to be referred to for determining the pixel arrangement for pixels to be assigned to each dot constituting the smallest data unit in dot codes to be printed on the printing medium on the basis of the parameter data relating to the resolution and specified by the resolution parameter specifying means and the resolution-related characteristics so that an optimal pixel arrangement may be selected according to the resolution-related characteristics by referring to the reference table.

Thus, the pixel arrangement specifying means can select an optimal pixel arrangement from the table without the need of cumbersome arithmetic operations.

(4) The coded data output apparatus according to (2), wherein the dot interval specifying means further includes a reference table to be referred to for determining the pixel interval for pixels to be assigned to each dot constituting the smallest data unit in dot codes to be printed on the printing medium on the basis of the parameter data relating to the resolution and specified by the resolution parameter specifying means and the resolution-related characteristics so that an optimal pixel interval may be selected according to the resolution-related characteristics by referring to the reference table.

Thus, the dot interval specifying means can select an optimal pixel interval from the table without the need of cumbersome arithmetic operations.

(5) The coded data output apparatus according to (2), wherein the pixel arrangement specifying means specifies an optimal pixel arrangement by modifying the geometrical arrangement of pixels for each dot when specifying the pixel arrangement for pixels to be assigned to each dot constituting the smallest data unit in dot codes to be printed on the printing medium.

Thus, the arrangement of pixels constituting each dot of dot codes from the output apparatus can be modified in such a way that an optimal shape such as circle may be used for dots to make them closest to the shape of the codes when they are read.

(6) The coded data output apparatus according to (5), wherein the pixel arrangement specifying means specifies an optimal pixel arrangement by modifying the geometrical arrangement of pixels for each dot in such a way that the diameter of each dot constituting the smallest data unit in dot codes to be printed on the printing medium is smaller than the ideal distance separating adjacent dots.

Thus, pixels are arranged in such a way that the diameter of each dot is smaller than the ideal distance separating adjacent dots so that dots are completely separated from each other and non-dot areas are not mistaken for dots.

(7) The coded data output apparatus according to (6), wherein each dot is formed by arranging a number of pixels in such a way that the diameter of each dot specified by the pixel arrangement specifying means is greater than a half of the ideal distance separating adjacent dots.

Thus, each dot is formed by arranging a number of pixels in such a way that the diameter of each dot is greater than a half of the distance separating adjacent dots so that dots can be read with a sampling rate sufficient for the reading operation.

(8) The coded data output apparatus according to (6), wherein each dot is formed by arranging a number of pixels in such a way that the surface area of each dot specified by the pixel arrangement specifying means is between 50% and 80% of the square of the ideal distance separating adjacent dots.

Thus, the number of pixels for forming a dot is controlled by the dot arrangement and selected in such a way that the surface area of each dot specified by the pixel arrangement specifying means is between 50% and 80% of the square of the ideal distance separating adjacent dots. Thus, an optimal dot size that minimizes the reading error rate can be selected.

(9) The coded data output apparatus according to (2), wherein the dot interval specifying means specifies a dot interval in such a way that the dot interval of the dots to be printed on the printing medium is equal to the smallest pixel interval of the plate making apparatus multiplied by an integer.

Thus, the dot interval specifying means determines by arithmetic operations that the dot interval has a pitch equal to the smallest pixel interval of the image setter multiplied by an integer and therefore no resampling occurs on dot codes.

(10) The coded data output apparatus according to (2), wherein the dot interval specifying means specifies a dot interval according to the interval of discrete aperture sampling of the image pick-up means for optically reading the dot codes printed on the printing medium.

Thus, the dot interval specifying means modifies the dot pitch (dot interval) of dot codes, taking the sampling by the image pick-up means into consideration so that the data can have an optimal size that accommodates the sampling of the CCD.

(11) The coded data output apparatus according to (10), wherein the dot interval specified by the dot interval specifying means satisfies the formula of $$\frac{2RX}{M} < n < \frac{5RX}{M}$$

where n is the pitch of the smallest pixels of the plate making apparatus (n: integer), R is the resolution [lines/mm] of the plate making apparatus, M is the optical magnification of the image pick-up means and X is the pixel interval of the image pick-up means when the coded data output apparatus outputs image data.

Thus, if n is the pitch of the smallest pixels of the plate making apparatus (n: integer), R is the resolution [lines/mm] of the plate making apparatus, M is the optical magnification of the image pick-up means and X is the pixel interval of the image pick-up means, the smallest pixels output from the image setter is projected to a size of M/RX on the CCD so that the dot diameter is made greater than the size of two pixels on the image pick-up apparatus to provide a resolution sufficient for a code reading operation when (2RX/M) <n is satisfied. Additionally, the dot diameter is made smaller than five pixels on the image pick-up apparatus to make the block or blocks to be read completely visible and to allow a high density data recording when n<(5RX/M) is satisfied.

(12) The coded data output apparatus according to (10), wherein each of the dot codes is formed by two-dimensionally arranging a plurality of blocks, each comprising a data dot pattern arranged in correspondence to the contents of data for the multimedia data and a marker arranged with a predetermined positional relationship with a corresponding the data dot pattern for determining reference point for the operation of reading the data dot pattern and the dot interval specifying means specifies a dot interval in such a way that the number of the block is maximized in the light receiving plane of the image pick-up means.

Thus, for reading data on a block-by-block basis, the dot interval can be modified according to the resolution of the image setter to maximize the number of blocks that can be read on the screen so that a large amount of data can be read with a single image pick-up operation.

(13) The coded data output apparatus according to (1), wherein each of the dot codes is formed by two-dimensionally arranging a plurality of blocks, each comprising a data dot pattern arranged in correspondence to the contents of data for the multimedia data and a marker arranged with a predetermined positional relationship with a corresponding the data dot pattern for determining reference point for the operation of reading the data dot pattern and the resolution parameter modifying means further includes marker position correcting means for correcting the position of the marker relative to the data dot pattern according to the modification of the parameter data relating to the resolution and specified by the resolution parameter specifying means according to the applied resolution-related characteristics specific to the plate making apparatus.

Thus, the position of the marker is corrected by taking the dot interval and the pixel arrangement for dots into consideration when modifying the pixel arrangement according to the resolution of the image setter to be used for the output apparatus.

For example, if the 4S-pixel arrangement is selected, the center of the dot is located on a boundary line separating pixels for the dot. On the other hand, if the 3S-type pixel arrangement is selected, the center of dot is located on the center of one of the pixels of the dot.

(14) The coded data output apparatus according to (13), wherein the marker position correcting means further includes a marker correction table specifying the relationship between the resolution-related characteristics specific to the plate making apparatus and the pixels constituting the marker so that it corrects the pixel value by a 0.5 pixel unit by referring to the marker correction table.

Thus, if the marker needs correction, the marker position correcting means selects the values of the pixels to be corrected on the marker correction table on the basis of the pixel arrangement when no correction is necessary and modifies the values by referring to the table so that the coordinates of the center of each marker can be moved by a 0.5 pixel without the need of cumbersome arithmetic operations.

(15) The coded data output apparatus according to (1), wherein each of the dot codes is formed by two-dimensionally arranging a plurality of blocks, each comprising a data dot pattern arranged in correspondence to the contents of data for the multimedia data and a marker arranged with a predetermined positional relationship with a corresponding the data dot pattern for determining reference point for the operation of reading the data dot pattern and the image data output means includes block arrangement specifying means for causing the direction of the blocks constituting the dot codes agree with the direction of the pixel arrangement of the plate making apparatus if it recognizes that the direction of the pixel arrangement does not agree with the longitudinal direction of the dot codes to be printed when it outputs the image data corresponding to the dot codes.

Thus, if the direction of the pixel arrangement of the output apparatus and the longitudinal direction of the dot codes are not parallel relative to each other for the output operation of the output apparatus, it corrects the direction of the dot codes to make it agree with the direction of the pixel arrangement so that the dots in the blocks are not resampled although the direction of the code arrangement is apparently not modified.

Therefore, the longitudinal direction of the dot codes of FIG. 18C is upwardly inclined by 45° at the right side, the blocks constituting the codes can be handled as if the longitudinal direction were inclined by 0° and agrees with the direction of the pixel arrangement of the image setter.

(16) The coded data output apparatus according to (1), wherein each of the dot codes is formed by two-dimensionally arranging a plurality of blocks, each comprising a data dot pattern arranged in correspondence to the contents of data for the multimedia data and a marker arranged with a predetermined positional relationship with a corresponding the data dot pattern for determining reference point for the operation of reading the data dot pattern and the image data output means includes dot interval regulating means for regulating the dot code interval so as not to cause dot code reading errors to occur if the image data corresponding to the dot codes are resampled by the pixel interval of the plate making apparatus if it recognizes that the direction of the pixel arrangement of the plate making apparatus does not agree with the longitudinal direction of the dot codes to be printed when it outputs the image data corresponding to the dot codes.

Thus, if the direction of the pixel arrangement of the output apparatus and the longitudinal direction of the dot codes are not parallel relative to each other for the output of the output apparatus, it determines by computation a dot pitch that does not interfere with the dot code reading operation if the dots are resampled and automatically outputs the determined dot pitch (dot diameter) to avoid any adverse effect of resampling.

(17) The coded data output apparatus according to (16), wherein the dot interval regulating means includes means for regulating the dot code interval without altering the direction of the dot codes and the direction of the blocks.

Thus, the codes can maintain the rectangular shape and the direction of the codes are not altered so that the code may be turned without changing the appearance.

(18) The coded data output apparatus according to (1), wherein the resolution parameter modifying means includes means for estimating the shape of each dot constituting the smallest data unit in dot codes to be printed on the printing medium and modifies the parameter data relating to the resolution and specified by the resolution parameter specifying means according to estimation of the estimating means.

Thus, while the shape of printed dots may vary depending on the type of paper to be used for the dot code output, the dot pitch and the dot shape may be optimized so as to accommodate the variance.

Printing ink can be blurred depending on the type of paper and printed dots can show a tendency of being thinned. If these problems are anticipated from the type of paper to be used, a relatively big pattern may be selected for dots to offset the problems.

(19) The coded data output apparatus according to (1), wherein the resolution parameter modifying means modifies the parameter data relating to the resolution and specified by the resolution parameter specifying means so as to optimize the shape of each dot constituting the smallest data unit in dot codes when dot codes are optically taken in by the image pick-up apparatus with a pixel interval having a predetermined aspect ratio.

Thus, dots can always be read with an optimal sampling ratio by specifying the shape of printed dot to be used for correcting the shape of the dots taken up with a pixel interval having an aspect ratio equal to that of the image pick-up apparatus.

(20) The coded data output apparatus according to (1), wherein the resolution parameter modifying means includes: pixel arrangement specifying means for specifying the pixel arrangement to be assigned to each dot constituting the smallest data unit in dot codes so as to optimize the shape of each dot constituting the smallest data unit in dot codes when dot codes are optically taken in by the image pick-up apparatus with a pixel interval having a predetermined aspect ratio; and dot interval specifying means for specifying a dot interval for each dot constituting the smallest data unit in dot codes.

Thus, the shape of printed dot can be specified to correct the shape of the dots taken up with a pixel interval having an aspect ratio equal to that of the image pick-up apparatus.

Additional advantages and modifications will readily occur to those skilled in the art. Therefore, the invention in its broader aspects is not limited to the specific details and representative devices shown and described herein. Accordingly, various modifications may be made without departing from the spirit and scope of the general inventive concept as defined by the appended claims and their equivalents.

What is claimed is:

1. A code data output method used when image data of a dot code is output from a computer to a recording apparatus for recording the dot code on a recording medium, the dot code comprising a plurality of dots each of which is respectively provided in any one of dot existing areas on the recording medium in association with data, which is reproduced in accordance with whether each of the dot existing areas includes any one of the dots, respectively, when the dots are optically read by a reading device, the computer producing the image data of the dot code in consideration of an enlarged size of said each of the dots which are supposed to be enlargedly recorded on the recording medium, when the recording apparatus records the dots on the recording medium such that said each of the dots has a predetermined size, and is respectively recorded in a corresponding one of the dot existing areas.

2. The code data output method according to claim 1, wherein the predetermined size is equal to 50% to 80% of said each of the dot existing areas.

3. The code data output method according to claim 2, wherein the predetermined size is equal to approximately 60% of said each of the dot existing areas.

4. The code data output method according to claim 1, wherein the recording apparatus is a plate making apparatus.

5. The code data output method according to claim 1, wherein the recording apparatus is a printer.

* * * * *